May 23, 1961 L. E. MYLTING 2,985,420
FLUID CONTROL DEVICES
Filed Jan. 16, 1958 3 Sheets-Sheet 1
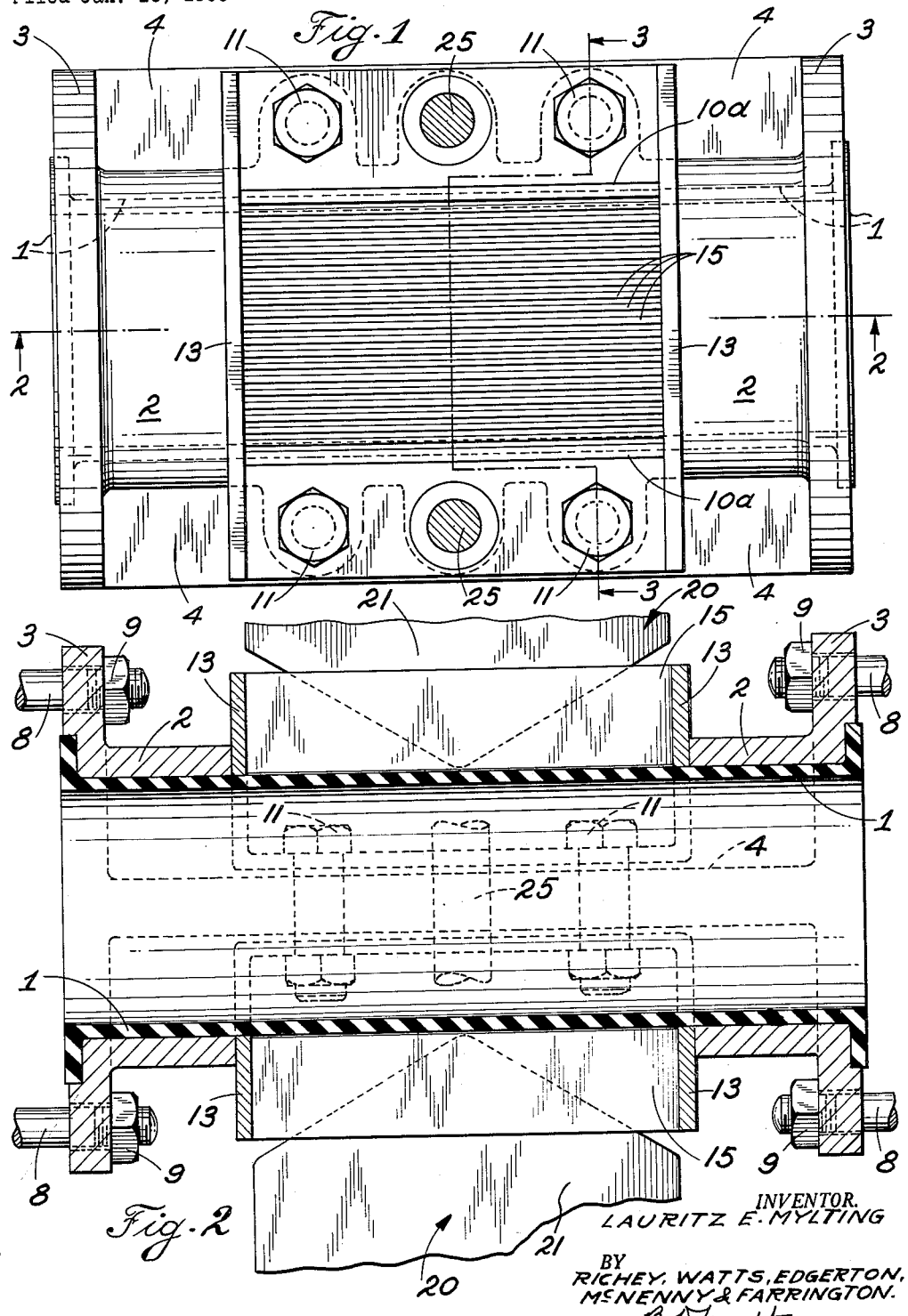
INVENTOR.
LAURITZ E. MYLTING
BY
RICHEY, WATTS, EDGERTON,
McNENNY & FARRINGTON.
ATTORNEYS

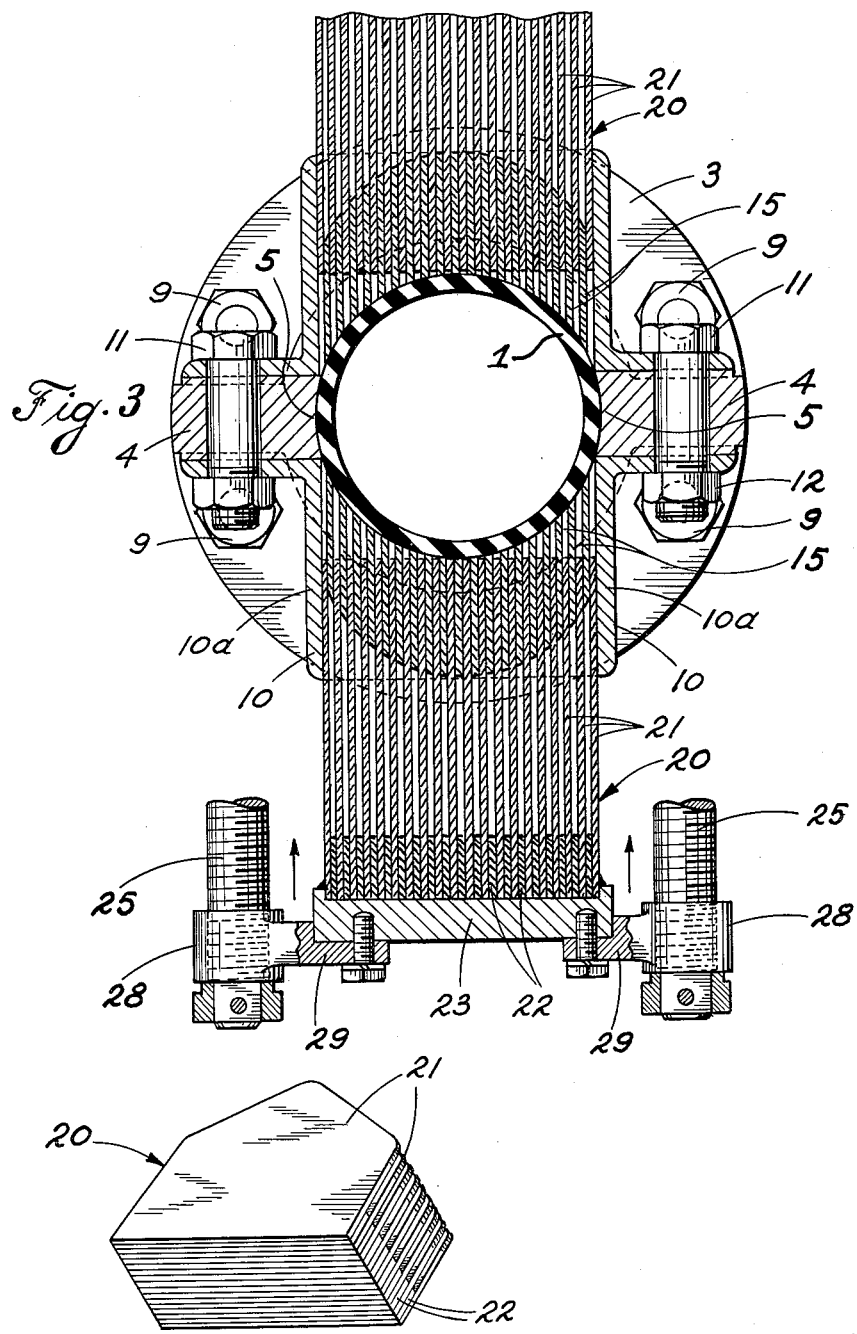

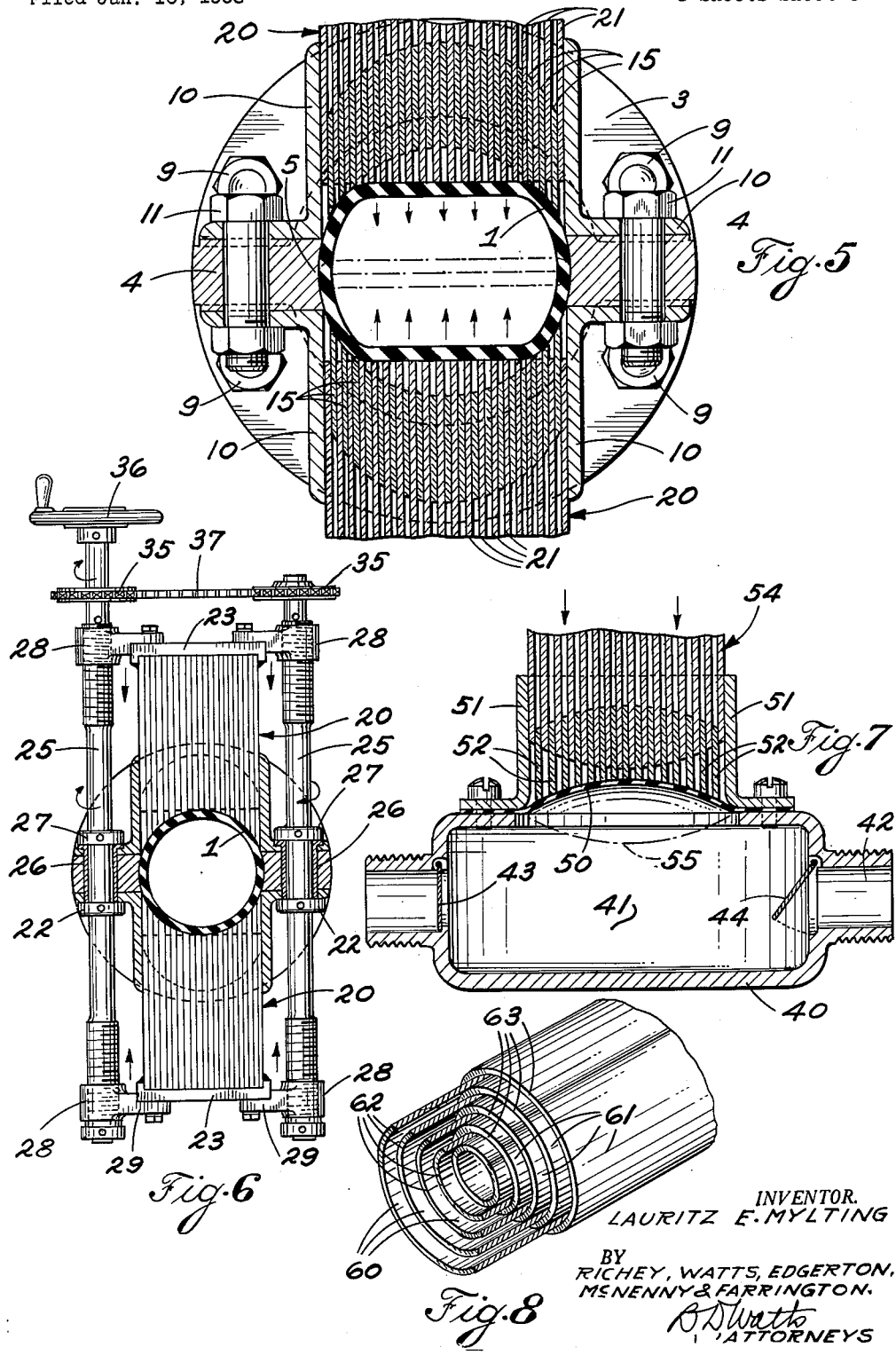

United States Patent Office 2,985,420
Patented May 23, 1961

2,985,420

FLUID CONTROL DEVICES

Lauritz E. Mylting, Ardmore, Pa., assignor to The Allen-Sherman-Hoff Company, Wynnewood, Pa., a corporation of Pennsylvania Filed Jan. 16, 1958, Ser. No. 709,287

9 Claims. (Cl. 251—8)

This invention relates generally to fluid control devices and is particularly concerned with new apparatus comprising a plurality of thin support members engageable with the one side of a flexible fluid engaging member and a plurality of thin actuator members movable relative to said support members and engageable with said flexible member to deform it and thereby exert control over fluid on the other side thereof.

The present invention makes it possible to employ thin, highly flexible, relatively weak tubes, diaphragms and the like to control, or exert force on, liquids at pressures far beyond those which the unsupported, flexible members could withstand.

The present invention will be better understood by those skilled in the art from the following specification and the accompanying drawings in which:

Fig. 1 is a side elevational view of a pinch valve for a tube embodying this invention;

Fig. 2 is a cross-sectional view taken on line 2—2 of Fig. 1;

Fig. 3 is a cross-sectional view taken on line 3—3 of Fig. 1;

Fig. 4 is a perspective view of one set of the actuator plates of Figs. 1 to 3;

Fig. 5 is a fragmentary view similar to Fig. 3 but with the actuator plates disposed in a mid-postion;

Fig. 6 is a view similar to Fig. 3 showing means for moving the actuator plates;

Fig. 7 is a central sectional view of a diaphragm pump embodying the present invention; and Fig. 8 is a fragmentary perspective view of another modified form of support and actuator members.

Figs. 1 to 6 show an embodiment of the present invention in which what might be termed a pinch valve is employed to control the flow of fluid through a flexible member or substantially to close the passage therethrough. The apparatus of these claims includes a tube 1 which has thin walls and is composed of flexible material of limited tensile strength. Means is provided for supporting the exterior of tube 1. This means includes cylindrical fittings 2 having outwardly projecting flanges 3 and diametrically opposite struts 4 connected to each of the fittings 2 and their flanges 3 and having their inner edges 5 substantially flush with the inner surfaces of fittings 2.

Means is provided for supporting the exterior of tube 1 between the opposed ends of fittings 2. This means comprises, in the present embodiment, a pair of angles, a pair of plates and a plurality of support members. The angles are shown at 10 and each is pressed against one side of struts 4 as by bolts 11 and nuts 12. The plates are shown at 13 and are fastened in any suitable manner, as by welding, to the parallel legs 10a of the angles 10. The angles 10 and plates 13 define a substantially rectangular space in which a plurality of support members, shown at 15, are held in closely spaced parallel position by being connected at their ends to plates 13, as by welding. The members 15 may vary considerably in thickness but preferably are made thin so as to afford more places of support for the tube 1. As shown these plates are about 16 ga.—.065" thick.

Means is provided for deforming the part of tube 1 lying between the axially spaced plates 13. The means illustrated for that purpose comprises a set or pack of actuator members 20 including individual actuator plates 21 and spacers 22 disposed between the outer edges thereof and the outer ends of these plates and spacers being connected to an end member 23, as by welding. The plates 21 are suitably dimensioned and located to pass between the support members 15 with fairly close sliding fit. The inner ends of the actuator plates 21 are preferably beveled in opposite directions so that the midpoint of the edge of each plate will first engage the outer surface of tube 1 and, as the actuator packs are moved inwardly against the tube, the length of edge contact of the plates 21 with the tube will increase. The plates 21 may vary in thickness but preferably are thin so as to afford more places of contact for tube 1. As shown, plates 21 are about 16 ga.—.065" thick. The spacers 22, as shown are about 14 ga.—.082" thick. The outer edges of plates 21 and spacers 22 are connected to end members 23, as by welding.

In Fig. 3 the parts of the device are shown in the positions they occupy when the tube is undeformed, as when it is full of a fluid under some pressure. As will be noted, substantially the entire outer surface of tube 1 is supported, the end portions bearing against the inner surface of the fittings 2 and the portion between those fittings being supported on the edges of support members 15. In Fig. 3 the actuator members are shown with the intermediate members barely in contact with the outer surface of tube 1.

In Fig. 5 the sets or packs of actuator members 21 are shown at an intermediate position where the outer surface of the tube between fittings 2 and struts 4 is supported partly by the support members 15 and partly by the actuator members 21. As this figure shows, the tube 1 has been deformed with partial closure of the passage therethrough. Although this figure shows that the tube 1 has a shorter circumferential length than it has in Fig. 3, it will be understood that no attempt has been made to show the wrinkling or other configuration which the tube may assume in being changed from the shape shown in Fig. 3 to that shown in Fig. 5.

Fig. 5 shows in dotted lines between the arrows the approximate position of the tube when the actuator members have been moved to their innermost position with resultant substantially complete closure of the passage through the tube.

It will be understood that as the actuator members or packs are moved toward one another they will exert a throttling or fluid flow controlling action on fluid within tube 1 and when moved to their innermost position will prevent any substantial flow of fluid through tube 1. It will also be understood that since the tube 1 is supported throughout its exterior surface at all times, it may be thin and relatively low in tensile strength and yet may carry fluids which are under sufficient pressure to break the tube if it were not so supported. As shown tube 1 has walls about ⅛" thick and the material is soft gum rubber.

In Figs. 3 and 6 is shown means for moving the actuator sets or packs toward and away from one another to control the flow of fluid through tube 1. This means comprises shafts 25 which extend through the flanges of angles 10 and struts 4, are fitted with bearings 26 in struts 4 and have collars 27 to engage said bearings and prevent endwise movement of the shafts while permitting rotational movement thereof. The adjacent ends of both shafts 25 are provided with righthand threads and the opposite ends of the two shafts are provided with lefthand threads. Brackets 28 are interiorly threaded to engage with the threads on shafts 25, and each bracket has an arm 29 connected to the adjacent end members 23 of the actuator pack therebetween. The shafts 25 extend far enough beyond one set of brackets 28 to accommodate sprockets 35 on the shafts and one shaft is also provided with a hand wheel 36. A chain 37 engages with the teeth of sprockets 35. By rotating wheel 36 the shafts may be rotated and, when they are rotated in one direction, the actuator packs are moved toward one another and, when they are rotated in the opposite direction, these packs are moved away from each other.

Fig. 7 illustrates an embodiment of the present invention as applied to a diaphragm pump which is to operate under pressure; for example, a mud pump or chemical pump supplied with mud or other fluid under sufficient pressure to move the diaphragm to its outermost position.

In this figure the body of the diaphragm pump is indicated at 40. This body has a chamber 41, inlet and outlet passages 42 and inlet and outlet valves 43 and 44 for the passages 42. A diaphragm 50 is connected to the body and closes an opening into chamber 41. This diaphragm is made of thin, flexible, readily deformable material. It is supported by a pack of support members corresponding generally to members 10, 15 and 20 of Figs. 1 to 6. The part corresponding to angles 10 is flanged tube 51, the parts corresponding to support plates 15 are indicated at 52, these plates being connected at their ends to tube 51, as by welding, and acuator members 54, corresponding to members 20, are disposed in closely spaced parallel position between angles 52 and are connected at their outer ends, as by welding. An actuator pack similar to that shown in Fig. 4 is assembled with the stationary support pack and its plates 54 are positioned between and in fairly close sliding engagement with support members 52. It will be understood that this actuator pack may be moved toward chamber 41 by any suitable mechanical means, or even manually, if desired.

The actuation plates 54 have edges so shaped as to engage the diaphragm first along its diameter and then along lines parallel to that diameter and progressively toward each side of the diaphragm. If it is desired that the diaphragm should be displaced uniformly around its center, the diaphragm engaging edges of the actuator plates may be shaped to form a segment of a spherical surface. In other words, the actuator plates would have the same edge shape on every diameter of the diaphragm as is shown in Fig. 7 on one diameter.

As will be noted, the support members 52 engage the outer surface of diaphragm 50 at closely spaced places and the diaphragm is maintained in its outermost position as shown in Fig. 7 by pressure of fluid in chamber 41. It will also be understood that when the fluid or other flowable material in chamber 41 is to be expelled, the actuator pack is moved toward the diaphragm and progressively engages it from its center toward its periphery with resultant shifting of the position of the diaphragm inwardly, the innermost position of the diaphragm being indicated by the dotted line 55.

Fig. 8 shows a modification of the support and actuator members. The support members are concentric tubes 60 and correspond to plates 15 of Fig. 3 and plates 52 of Fig. 7. The actuator members are also concentric tubes 61 and correspond to plates 21 of Fig. 3 and plates 54 of Fig. 7. Members 61 are positioned between and in close sliding engagement with tubes 60. Since members 60 are engageable with the diaphragm on concentric circles they should have their diaphragm engaging edges 62 formed to define a concave surface constituting a segment of a sphere. The diaphragm engaging surfaces 63 of the members 61 should be formed to define a convex surface constituting a segment of a sphere. When the edges are formed in this manner the diaphragm will be supported by the concave surface and the actuator members will change the shape of the diaphragm progressively outward from its center from a convex outer surface to a concave outer surface.

It is to be understood that the fixed supports and movable actuators need not be flat, as shown in Figs. 1 to 7, nor tubular, as shown in Figs. 7 and 8, for obviously they may be variously shaped. For example, the flat members may be corrugated and the tubular members may have a variety of cross-sectional shapes such as oval or elliptical. In general the shape of these fixed and movable members may take any shape suitable for any particular application.

It is also to be understood that the edges of the fixed and movable plates of Fig. 7 need not be designed to make the diaphragm conform to spherical surfaces, but may both be shaped differently to vary the relationship of diametric diaphragm displacement to lineal movement of the movable plates.

It is also to be understood that this device can be used not only for controlling fluids, but also for controlling mechanical devices actuated by the fluid.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. Fluid control apparatus comprising a hollow rigid body through which fluid is to flow and which has an opening in one wall thereof, a thin, flexible member in said body and having a movable portion extending across said opening, a plurality of thin, closely spaced, elongated support members fixed in position relative to said movable portion and a plurality of thin, closely spaced, elongated actuator members disposed between and movable in close sliding fit with said support members over longitudinally extended portions of the latter members, the support members and actuator members being coextensive and engageable with the entire exposed surface of said movable portion including its central part, the edges of said support members extending entirely across and engaging the movable portion when the actuator members are in fluid flow permitting position, and the edges of the actuator members extending entirely across and engaging the movable portion when they are in fluid flow limiting position.

2. Fluid control apparatus comprising a hollow body having rigid walls partly defining an opening in one wall thereof and an open end passage leading to said opening, a thin, flexible member in said body and having a movable portion extending across said opening, a plurality of thin, closely spaced, elongated support members fixed in position relative to said movable portion and a plurality of thin, closely spaced, elongated actuator members disposed between and movable in close sliding fit with said support members over longitudinally extended portions of the latter, the support members and actuator members being co-extensive and engageable with the entire exposed surface of said movable portion including its central part, the edges of said support members extending entirely across and engaging the movable portion when the actuator members are in fluid flow permitting position, and the edges of the actuator members extending entirely across and engaging the movable portion when they are in fluid flow preventing position.

3. Fluid control apparatus comprising a pipe through which fluid is to flow and which has an opening in one wall thereof, rigid walls outside of said pipe around said opening, a thin, flexible tube in said body and having a movable portion extending across said opening, a plurality of thin, closely spaced, elongated support members fixed in position within said rigid walls and a plurality of thin, closely spaced, elongated actuator members disposed between and movable in close sliding fit with said support members over longitudinally extended portions of the latter, the support members and actuator members being co-extensive and engageable with the entire exposed surface of said movable portion including its central part, the edges of said support members extending entirely across and engaging the movable portion when the actuator members are in fluid flow permitting position, and the edges of the actuator members extending entirely across and engaging the movable portion when they are in fluid flow preventing position.

4. Fluid control apparatus comprising a hollow rigid body through which fluid is to flow and which has an opening in one wall thereof, a thin, flexible diaphragm in said body and having a movable portion extending across said opening, a plurality of thin, closely spaced, elongated support members fixed in position relative to said movable portion and a plurality of thin, closely spaced, elongated actuator members disposed between and movable in close sliding fit with said support members over longitudinally extended portions of the latter, the support members and actuator members being co-extensive and engageable with the entire exposed surface of said movable portion including its central part, the edges of said support members extending entirely across and engaging the movable portion when the actuator members are in fluid flow permitting position, and the edges of the actuator members extending entirely across and engaging the movable portion when they are in fluid flow preventing position.

5. The combination of elements set forth in claim 1 in which the support members and the actuator members are flat sheets.

6. The combination of elements set forth in claim 1 in which the flexible member engaging edges of the support members are disposed on an arc to engage an arc-shaped movable portion of the flexible member.

7. The combination of elements set forth in claim 1 in which the edges of the actuator members are disposed on an arc to engage an arc-shaped surface of the movable portion of the flexible member.

8. The combination of elements set forth in claim 1 in which the support members and the actuator members are concentric tubes.

9. The combination of elements set forth in claim 8 in which the edges of the support members are positioned on a segment of a concave spherical surface and the edges of the actuator members are disposed on a segment of a concave spherical surface.

References Cited in the file of this patent

UNITED STATES PATENTS

| | | |
|---|---|---|
| Re. 19,151 | Saunders | May 1, 1934 |
| 1,445,844 | Mueser | Feb. 20, 1923 |
| 2,388,988 | Mueser | Nov. 13, 1945 |

FOREIGN PATENTS

| | | |
|---|---|---|
| 643,904 | Great Britain | of 1950 |